United States Patent [19]

Wanek

[11] 4,327,388
[45] Apr. 27, 1982

[54] TRANSDUCER-CARRIAGE ASSEMBLY WITH SPRING SUSPENSION

[75] Inventor: Donald J. Wanek, Rochester, Minn.

[73] Assignee: International Business Machines Corporation, Armonk, N.Y.

[21] Appl. No.: 121,947

[22] Filed: Feb. 15, 1980

[51] Int. Cl.³ .......................... G11B 5/48; G11B 5/54; G11B 21/12; G11B 21/20
[52] U.S. Cl. .................................... 360/104; 360/105
[58] Field of Search ................ 360/104, 105, 99, 106

[56] References Cited

U.S. PATENT DOCUMENTS

| | | | |
|---|---|---|---|
| 3,018,152 | 1/1962 | Cowan | 360/105 |
| 3,812,535 | 5/1974 | Higgins et al. | 360/103 |
| 3,946,439 | 3/1976 | Castrodale et al. | 360/105 |
| 4,089,029 | 5/1978 | Castrodale et al. | 360/99 |
| 4,191,980 | 3/1980 | King et al. | 360/99 |
| 4,209,813 | 6/1980 | Bryer | 360/99 |
| 4,263,630 | 4/1981 | Pierson | 360/104 |

OTHER PUBLICATIONS

King et al., "Diskette Retainer Fork", IBM Tech. Disc. Bull., vol. 22, No. 8A, Jan. 1980, p. 3342.

Bailey et al., "Read/Write . . . Device", IBM Tech. Disc. Bull., vol. 18, No. 7, Dec. 1975, p. 2246.

Primary Examiner—Robert S. Tupper
Attorney, Agent, or Firm—Keith T. Bleuer

[57] ABSTRACT

A carriage assembly for holding a pair of opposite transducers in contact with the opposite sides of a flexible magnetic disk including a swing arm for carrying each of the transducers. E-shaped leaf springs support the swing arms with respect to a carriage using the two outer legs of each of the springs which are substantially flat and unstressed when the transducers are in contact with the disk. The central legs of the E-shaped springs are connected together so as to urge the swing arms and transducers together and allow the swing arms and transducers to be parted for the insertion of a disk into operative position. A gimbal spring and a loading spring support each of the transducers with respect to one of the swing arms. The gimbal springs, loading springs and E-shaped springs are balanced with respect to each other so as to hold the transducers in light data transferring contact with the disk. The outer legs of the E-shaped springs flex for low frequency undulations of the disk, and the loading springs and gimbal springs flex for high frequency undulations of the disk.

10 Claims, 12 Drawing Figures

TRANSDUCER-CARRIAGE ASSEMBLY WITH SPRING SUSPENSION

CROSS REFERENCES TO RELATED APPLICATIONS

This application is related to the copending application of F. K. King, et al, Ser. No. 76,719 filed Sept. 19, 1979, now U.S. Pat. No. 4,291,350, which is a continuation of the application of F. K. King, et al, Ser. No. 974,600 filed Dec. 29, 1978, now abandoned, and is also related to the application of F. K. King, et al, Ser. No. 110,728 filed Jan. 9, 1980 which is a continuation of the application of F. K. King, et al, Ser. No. 974,480 filed Dec. 29, 1978, now abandoned.

BACKGROUND OF THE INVENTION

The invention relates to magnetic transducers, particularly those effective on flexible magnetic disks; and in particular the invention relates to spring suspensions for such transducers.

It has been previously proposed in Castrodale, et al, U.S. Pat. No. 4,089,029, issued May 9, 1978, to provide a two transducer-carriage assembly for a flexible magnetic disk which includes a gimbal spring for supporting each of the two transducers, a load arm effective on each of the two transducers for moving the transducer in pressure contact with the disk and a swing arm for mounting both the gimbal spring and the load arm for each of the transducers. There is a type of universal joint between each of the load arms and the respective gimbal spring so that the transducers may pitch and roll with corresponding undulations of the flexible disk. Each of the swing arms is mounted by means of a leaf spring with respect to a carriage of the assembly allowing the swing arms and thus the transducers to be moved apart whereby a flexible magnetic disk assembly may be moved between the swing arms and transducers. The carriage includes abutments for limiting the approaching movement of the swing arms and transducers together so that the gimbal springs provide the complete resilient effects allowing pitching, rolling and other movement of the transducers with undualations of the flexible disk, with the transducers remaining all the time in data transferring contact with opposite sides of the disk.

SUMMARY OF THE INVENTION

It is an object of the present invention to provide an improved carriage assembly for a pair of transducers effective on the opposite sides of a thin flexible magnetic disk which includes a pair of opposite leaf springs supporting a pair of arms carrying transducers by means of gimbal springs, with the leaf springs and gimbal springs cooperating to accurately keep the transducers on the two sides of the disk in register with each other while maintaining the transducers in data transferring contact with the disk as the disk undulates during its rotation.

In a preferred form, the transducer-carriage assembly of the invention includes a pair of swing arms and a leaf spring mounting each of the swing arms with respect to a carriage. Each of the swing arms carries a transducer on its distal end, and a gimbal spring is provided for mounting each of the transducers with respect to its respective arm. A backup spring is provided for each of the gimbal springs, and there is a type of universal joint connection between the backup spring and the respective gimbal spring so as to allow universal motion of the transducer carried by the gimbal spring. The leaf springs have the same spacing as the universal joint connections, and the respective universal joint connections are in the same planes as the leaf springs so that for relatively low frequency undulations of the disk, the two arms move as a unit and swing about the leaf springs supporting them; and for high frequency undulations of the disk the gimbal springs yield. For both the high frequency undulations and the low frequency undulations, the leaf springs and gimbal springs effectively maintain the transducers in effective data transferring contact with the disk.

DESCRIPTION OF THE PREFERRED EMBODIMENTS

Figure 1:
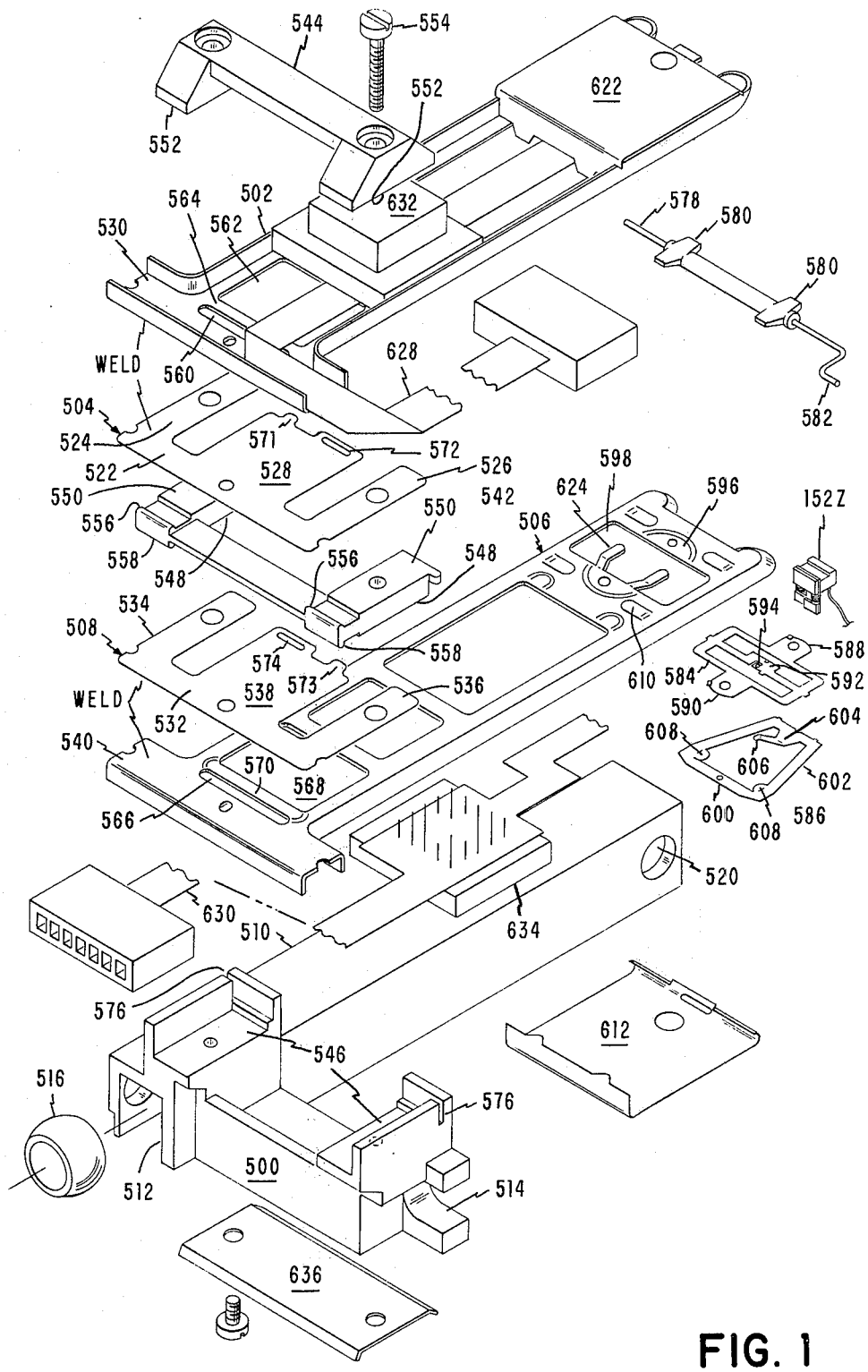
FIG. 1 is an exploded view of a transducer carriage assembly embodying the principles of the invention.

The transducer carriage assembly 70Z (see FIGS. 1-5) hereof may take the place of the carriage 70 disclosed in Castrodale et al, U.S. Pat. No. 4,089,029 issued May 9, 1978 and may be used in the data storage apparatus disclosed in this patent. Carriage 70Z includes a support or carriage 500 (see FIG. 1 in particular) slideably disposed on guide rods 76Z and 78Z which correspond with the guide rods 76 and 78 of U.S. Pat. No. 4,089,029. The carriage assembly 70Z is adapted to be used in connection with a magnetic disk assembly or diskette 18Z (see FIG. 2) which has a flexible magnetic disk 20Z rotatably disposed in a jacket 22Z and corresponds with the disk assembly 18 of U.S. Pat. No. 4,089,029. The guide rods 76Z and 78Z extend parallel with the plane of the disk 20Z so that the support 500 travels parallel with the plane of the disk. The disk is clamped at its center and is rotatably driven by the clamping means as is disclosed in U.S. Pat. No. 4,089,029. The assembly 70Z includes a pair of transducers 150Z and 152Z (see FIG. 3) which travel with the carriage 500 so that the transducers 150Z and 152Z move radially across and in data transferring contact with the opposite surfaces of the disk 20Z within radial slots 28Z in the jacket 22Z. The transducer 150Z is carried by a rigid metal swing arm 502 that in turn is connected with the support 500 by an E-shaped spring 504, and the transducer 152Z is carried by a swing arm 506 that in turn is connected with the support 500 by means of an E-shaped spring 508.

The support 500 on one side is provided with a leg 510 having an elongate slot 512 (see FIG. 1) therein for receiving the guide rod 76Z and is provided with a slot 514 on the other side for receiving the guide rod 78Z. A pair of grommets 516 and 518 (see FIG. 2) are slideably disposed on the guide rod 76Z for the purpose of slideably disposing the support 500 with respect to the rod 76Z. The grommets 516 and 518 extend through openings 520 in the walls of the support 500 for the purpose of fixing the grommets 516 and 518 with respect to the support 500.

Figure 3:
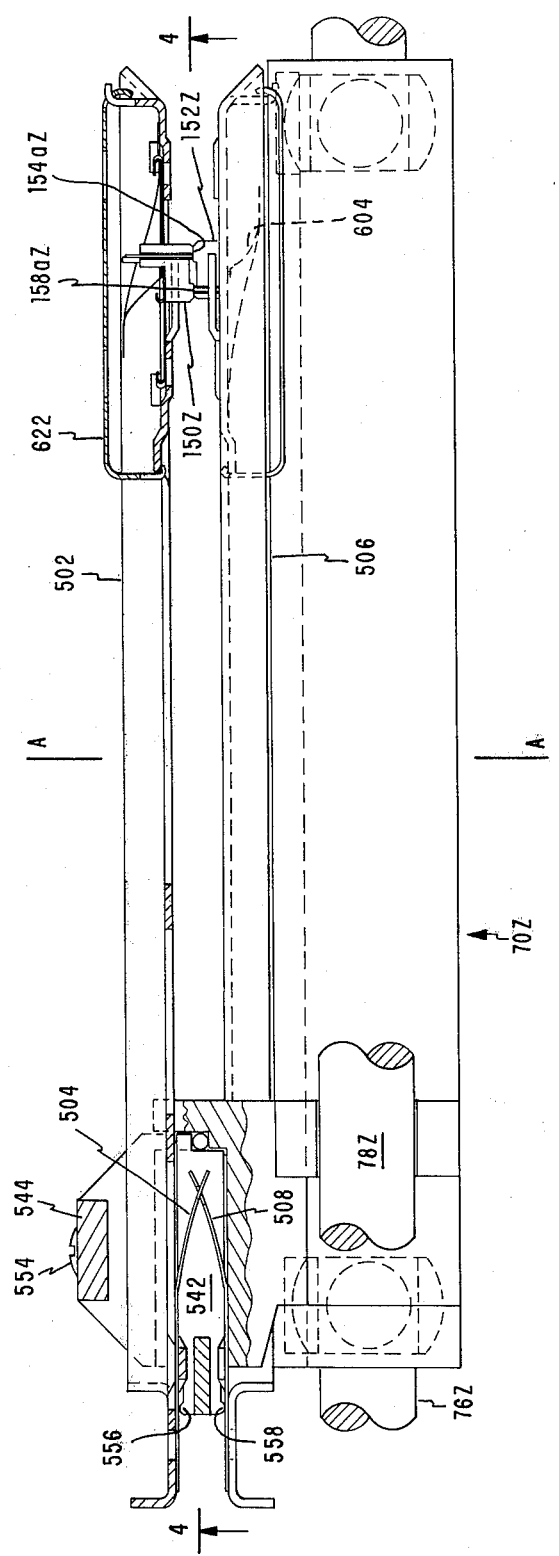
FIG. 3 is a side elevational view, partly in section, of the carriage assembly.
Figure 4:
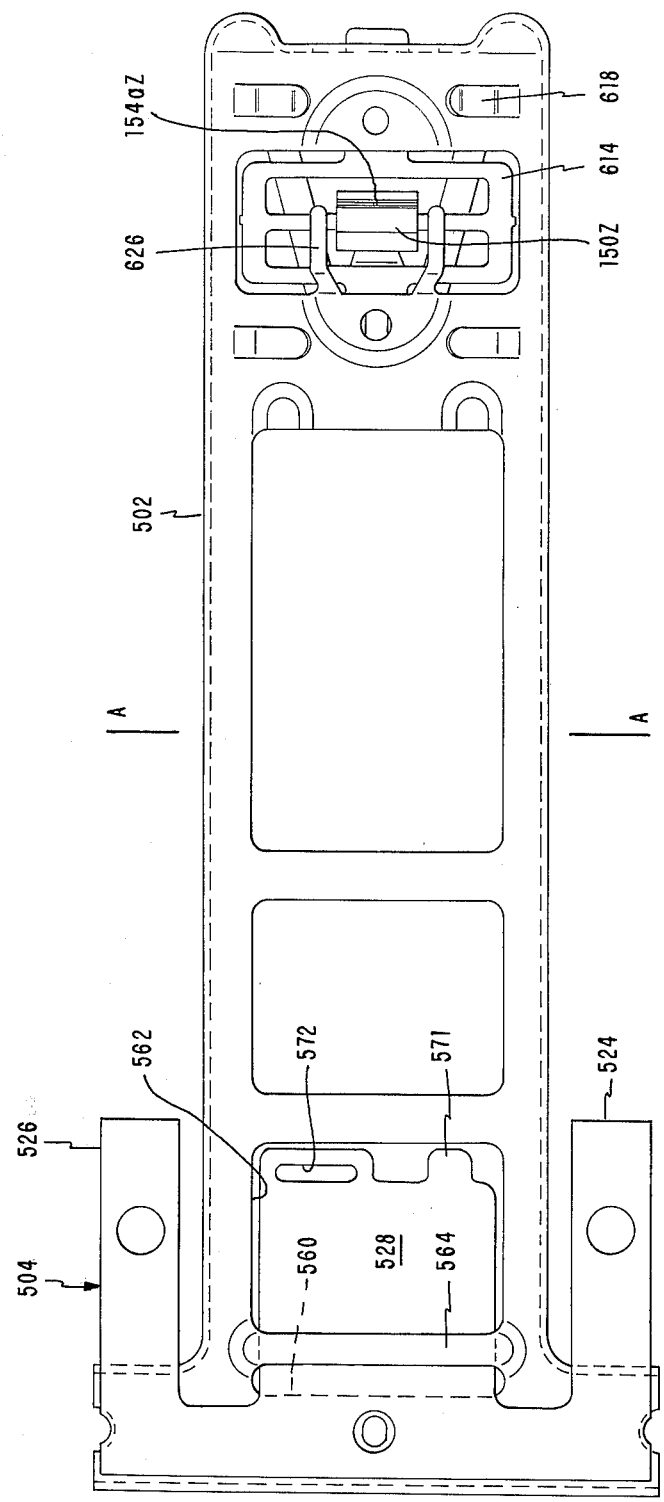
FIG. 4 is a bottom view of the upper swing arm of the assembly and taken on line 4—4 of FIG. 3.
Figure 5:
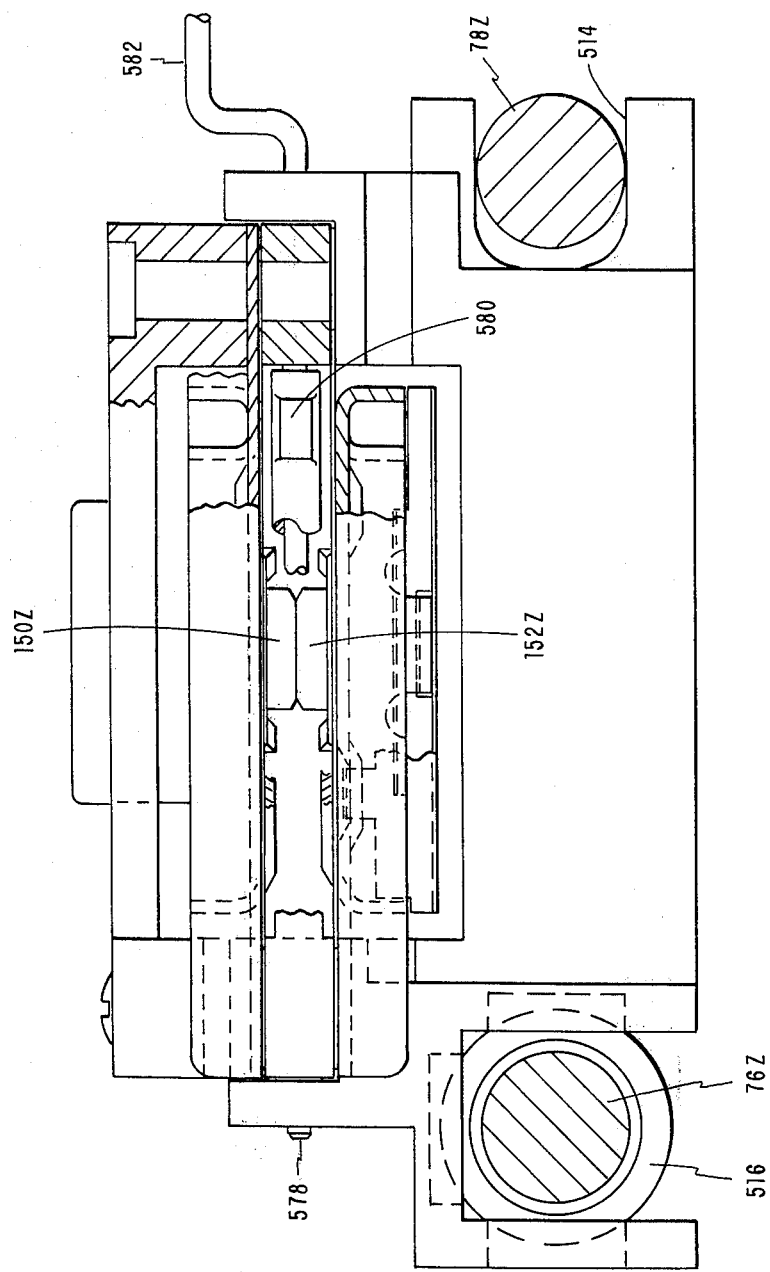
FIG. 5 is an end view of the carriage assembly and taken on line 5—5 of FIG. 2.
Figure 6:
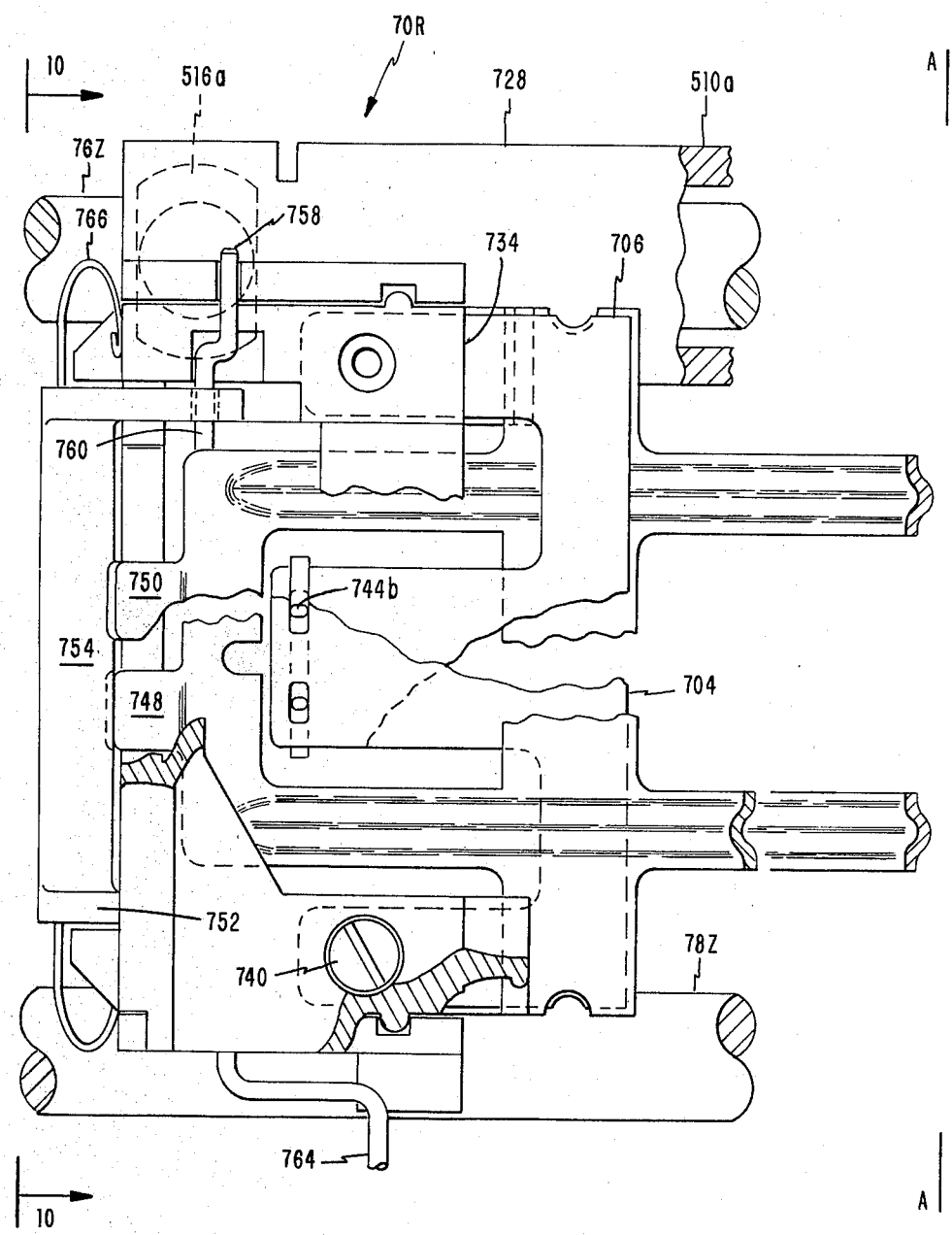
FIG. 6 is a fragmentary top plan view of a modified carriage assembly of the invention.

The spring 504 includes a base portion 522 (see FIG. 1), outer legs 524 and 526 joined to the base portion 522 and a central leg 528 also joined to the portion 522. The swing arm 502 is provided with a base portion 530, and the two base portions 522 and 530 are fixed together as by welding. The construction of the swing arm 506 and spring 508 is similar to that of the spring 504 and swing arm 502. The spring 508 is provided with a base portion 532 and legs 534, 536 and 538. The swing arm 506 is provided with a base portion 540, and the base portions 532 and 540 are fixed together as by welding. The spring 504 is welded to the lower surface of the arm 502, and the spring 508 is welded to the upper surface of the arm 506, as these arms are illustrated in FIG. 3. In the assembly, the spring legs 524, 526, 528, 534, 536 and 538 extend toward the transducers 150Z and 152Z as is apparent from FIGS. 1 and 3 in particular.

A U-shaped separator 542 (see FIG. 1 in particular) is disposed between the springs 504 and 508, and a clamp member 544 is disposed above the spring 504. The support 500 has flat surfaces 546; the separator 542 has flat surfaces 548 and 550; and the clamp member 544 has flat surfaces 552. The spring legs 534 and 536 are clamped between the flat surfaces 546 and 548, and the spring legs 524 and 526 are clamped between the flat surfaces 550 and 552, with screws 554 extending through the clamp member 544 and the separator 542 and into the support 500 for the purpose of clamping these parts together.

The separator 542 is provided with fulcrum edges 556 and 558 on opposite surfaces. The springs 504 and 508 respectively are in contact with the edges 556 and 558, and the edges 556 and 558 thus pivotally support the swing arms 502 and 506 respectively, since the base portions 522 and 530 are welded together as are the base portions 532 and 540.

The swing arm 502 is provided with openings 560 and 562 which are separated by a bridging portion 564. The swing arm 506 is provided with similar openings 566 and 568 and a bridging portion 570. The spring leg 528 extends through the opening 560, over the bridging portion 564, and thence back through the opening 562. Likewise, the spring leg 538 extends through the opening 566, over the bridging portion 570, and back through the opening 568. The spring leg 528 is provided with an end tongue 571 and a slot 572, and the spring leg 538 is provided with an end tongue 573 and a slot 574. The tongue 571 extends through the slot 574 and the tongue 573 extends through the slot 572 to thus fix the ends of the central legs 528 and 538 together between the swing arms 502 and 506.

The support 500 is provided with a pair of slots 576 therein, and a shaft 578 extends through the slots 576. The shaft 578 has a pair of toggles 580 fixed with respect to it and has a crank arm portion 582 on one end. The toggles 580 are respectively in line with and located between opposite side portions of the arms 502 and 506 at opposite sides of the openings 562 and 568.

The magnetic head 152Z is carried by the swing arm 506 by means of a gimbal spring 584 on which the head 152Z is attached and which is backed by a loading or backup spring 586. The gimbal spring 584 is in the form of a figure eight having a pair of end legs with which outwardly extending tab portions 588 and 590 are integral. The central leg has a tab portion 592, and a dimple 594 is struck in the tab portion 592 to extend in the downward direction as the spring 584 is shown in FIG. 1. The swing arm 506 has a pair of flat platform portions 596 on the opposite edges of an opening 598 in the swing arm 506, and the spring 584 is fixed across the opening 598 on the platform portions 596 by means of the tab portions 588 and 590. The head 152Z is fixed on the tab portion 592 so as to thus extend through the opening 598 toward the opposite swing arm 502. The dimple 594 is located just below the approximate center of the upper (active) face of the head 152Z on which the read/write gap 158aZ is located as head 152Z is shown in FIG. 3.

The spring 586 has a base leg 600 and a pair of opposite leg portions 602 tapering toward each other and toward a leg portion 604. The leg portion 604 extends upwardly (in the disposition of the spring 586 shown in FIGS. 1 and 3) out of the plane of the leg portions 600 and 602 and terminates in a flat flange portion 606 which lies in a plane parallel with that of the leg portions 600 and 602. The spring 586 is provided with a pair of tab portions 608 extending toward each other and located beneath a pair of tongue portions 610 struck out of the swing arm 506 for holding the spring 586 in place. The spring 586 is thus located beneath the gimbal spring 584 (in the dispositions of the parts shown in FIGS. 1 and 3), and the flange portion 606 rests on the dimple 594 for supporting the gimbal spring 584 and the head 152Z. A magnetic shield 612 is clamped onto the arm 506 and over the assembly of the springs 584 and 586 and the head 152Z.

The head 150Z is supported from the arm 502 by springs 614 and 616 which are identical with the previously described springs 584 and 586. (Incidentally, the arm 502 and the transducer 150Z are identical respectively with the arm 506 and the transducer 152Z.) The spring 614 has the same transducer supporting dimple 594a as does the spring 584, and a leg portion 604a and its flange portion 606a of spring 616 bear on this dimple. The spring 616 has the tapering leg portions 602a corresponding to the leg portions 602 of the spring 586. The transducer 150Z and the springs 614 and 616 are, however, turned through 180 degrees with respect to the dispositions of the head 152Z and the springs 584 and 586 used in connection with the arm 506. A pair of tongue portions 618 adjacent the distal end of the arm 502 are thus used for fixing the spring 616 in place, and its leg portion 604a disposed out of the plane of the rest of the spring 616 thus extends toward the distal end of the arm 502 rather than toward the opposite end as is the case with the leg portion 604 of the spring 586. The read/write gaps 154aZ and 158aZ are out of line with respect to each other as is apparent from FIG. 3, and the upstanding magnetic cores and the energizing windings disposed thereon are thus likewise out of line. The springs 586 and 616 are reversed with respect to each other so that the leg portions 604 and 604*a* supporting the gimbal springs 584 and 614 clear the upstanding cores.

A shield 622 which is identical with the shield 612 is clamped on the arm 502 over the assembly of the springs 614 and 616 and the head 150Z.

The arm 506 is provided with a pair of fingers 624 that overlie the central leg of the gimbal spring 584 on opposite sides of the head 152Z for the purpose of assuring that the head 152Z moves outwardly as the arm 506 swings outwardly. The arm 502 is provided with a similar pair of fingers 626 that act in the same manner with respect the gimbal spring 614 and head 150Z.

Electronic cables 628 and 630 are respectively fixed on the arms 502 and 506 and are connected with the transducers 150Z and 152Z. Electronic modules 632 and 634 are respectively electrically in the cables 628 and 630 and are fixed on outer surfaces of the arms 502 and 506. A clamp plate 636 is fixed to the support 500 for clamping the cables 628 and 630 in place with respect to the support 500.

The transducers 150Z and 152Z are positioned by the carriage assembly 70Z in operating positions within the opposite aligned radial slots 28Z in the disk assembly 18Z and in contact with the disk 20Z. The disk 20Z is preferably held in its proper operating plane by a pair of fixed tines or fingers 636 on the opposite sides of the assembly 18Z and another pair of fixed tines 638 on the opposite sides of the assembly 18Z. As is apparent from FIG. 2, the tines 636 are located on one side of the slots 28Z, while the other tines 638 are located on the other side of the slots 28Z. The tines 636 and 638 may be the same as and constructed in the same manner as the disk assembly retaining tines disclosed in the IBM Technical Disclosure Bulletin publication, Volume 22, No. 8A, January 1980, pages 3342–3344, and this publication may be referred to for further details of the tines 636 and 638 and their placement with respect to the disk assembly 18Z.

Figure 2:
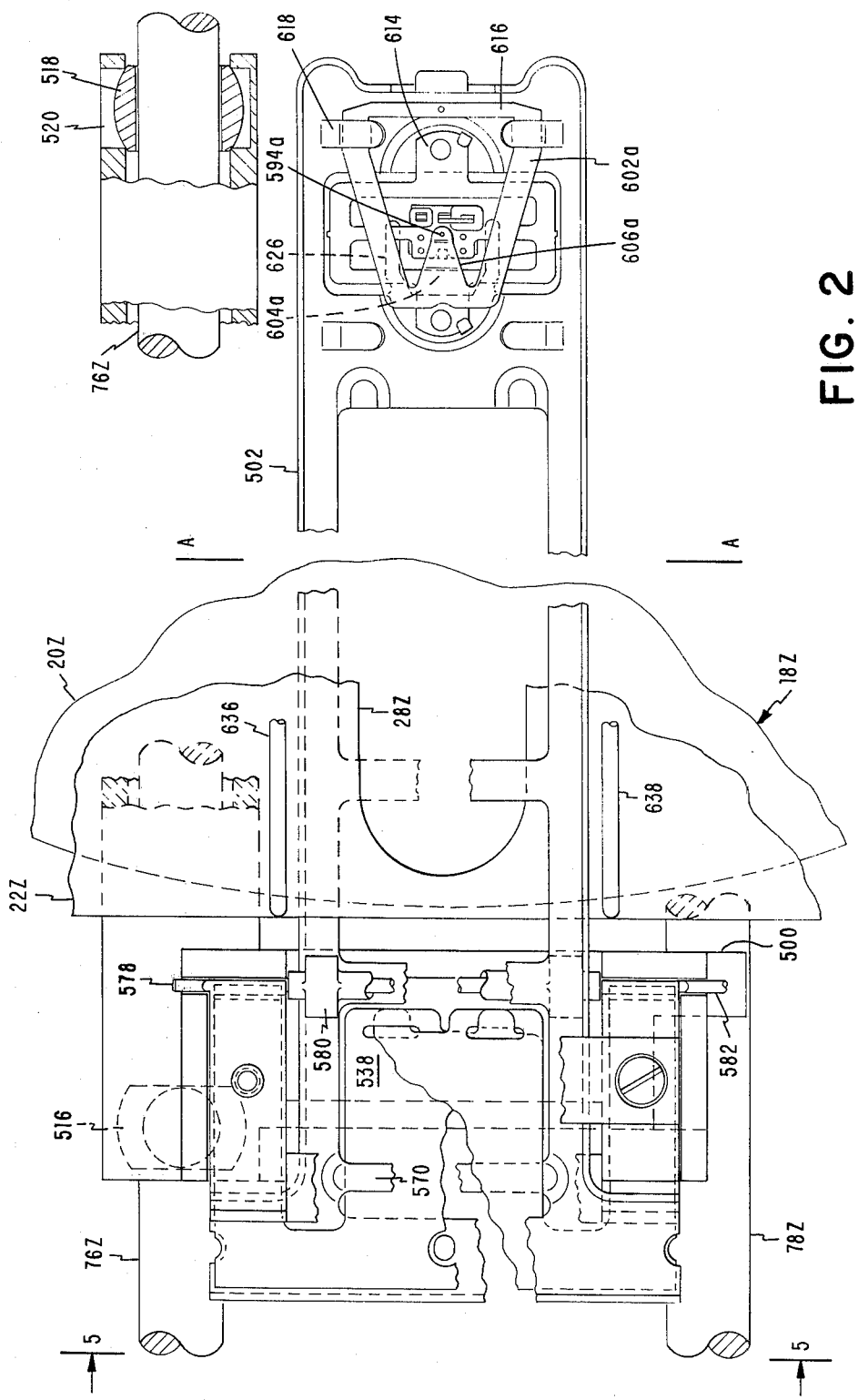
FIG. 2 is a top plan view of the carriage assembly.

In operation, the transducer carriage assembly 70Z has its arms 502 and 506 controlled by the crank arm portion 582 of the shaft 578. Initially the crank arm portion 582 is so turned as to bring the toggles 580 into engagement with inner surfaces of the arms 502 and 506 so as to hold the arms swung outwardly to separate the transducers 150Z and 152Z against the action of the springs 504 and 508. The diskette assembly 18Z may then be moved into its position as shown in FIG. 2 between the tines 636 and 638. The crank arm portion 582 is then again actuated so as to release the toggles 580 with respect to the arms 502 and 506 allowing the springs 504 and 508 and particularly the spring legs 528 and 538 to move the transducers 150Z and 152Z into contact with the disk 20Z. Under these conditions, the arms 502 and 506 are parallel; the spring legs 524 and 526 are flat and unstressed; the legs 534 and 536 are also flat and unstressed; the legs 524 and 526 are in the same plane as the dimple 594; the legs 534 and 536 are in the same plane as the dimple 594*a*; and these two last named planes are parallel so that the spacing between the dimples 594 and 594*a* is the same as the spacing of the legs 524 and 526 with respect to the legs 534 and 536.

The disk 20Z is then rotated by the disk clamping means associated with the disk 20Z, and the transducers 150Z and 152Z are in data transferring contact with the opposite magnetic faces of the disk 20Z. In particular at this time, a reading or writing action may take place with respect to the opposite magnetic faces of the disk 20Z by means of the gaps 154*a*Z and 158*a*Z which are out of line as is shown in FIG. 3. There is a balance of the forces by the springs 504 and 508 and the springs 584, 586, 614 and 616 maintaining the transducers 150Z and 152Z in very light contact with the opposite faces of the disk 20Z. Under these conditions, the loading springs 586 and 616 are substantially stressed out of their unstressed dispositions, with the leg portions 602 and 602*a* in particular being stressed out of flat unstressed conditions. The gimbal springs 584 and 614 are in their substantially flat unstressed conditions under these circumstances. The disk 20Z may be expected to wobble in its rotation, and the spring legs 524, 526, 534 and 536 in particular slightly flex with relatively low frequency undulations ("DC" runout) of the disk 20Z with corresponding slight swinging of the arms 502 and 506 about the fulcrum edges 556 and 558. During these "DC" low frequency runouts, the arms 502 and 506 act as a unit and swing equal distances in the same direction without impediment by the support 500 so that the arms 502 and 506 remain the same distances apart. The transducers 150Z and 152Z with this arm movement move normally to the plane of the disk 20Z and in a plane parallel with the axis of rotation of the disk 20Z. The gimbal springs 584 and 614 together with the leg portions 602 and 602*a* of the backup springs 586 and 616 in particular flex with high frequency undulations ("AC" runout) of the disk 20Z, with the springs all the time maintaining the transducers in light data transferring contact with the opposite faces of the disk 20Z. The arms 502 and 506 have no substantial swinging movements for "AC" runout. During these actions, the transducers 150Z and 152Z may each pitch and roll by pivoting about dimples 594 and 594*a* supported by flat flange portions 606 and 606*a* which function as transducer universal joint connections. This pitching and rolling is substantially the same as the transducer pitching and rolling allowed by the transducer universal joint connections of U.S. Pat. No. 4,089,029.

Figure 7:
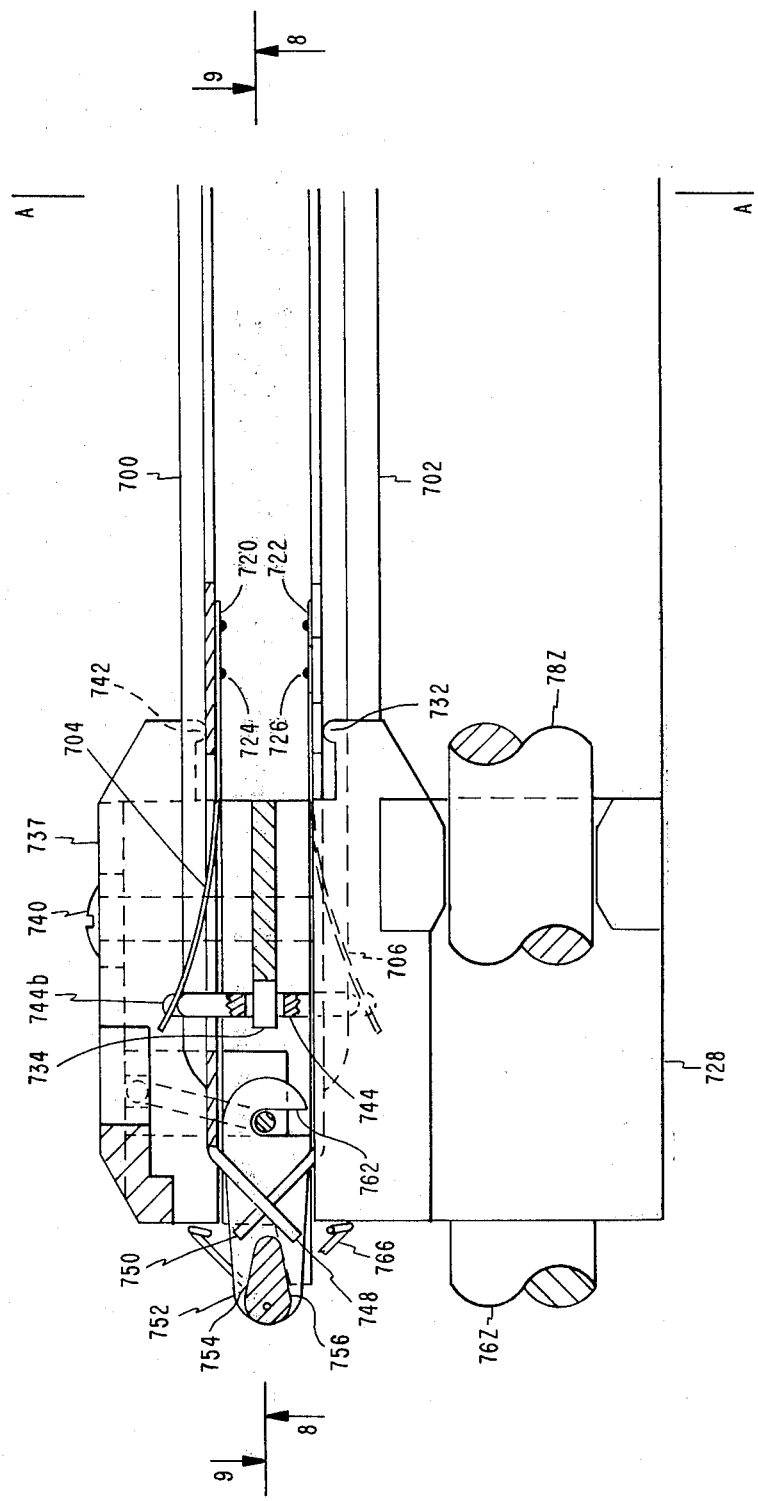
FIG. 7 is a fragmentary side elevational view, partly in section, of the carriage assembly shown in FIG. 6.
Figure 8:
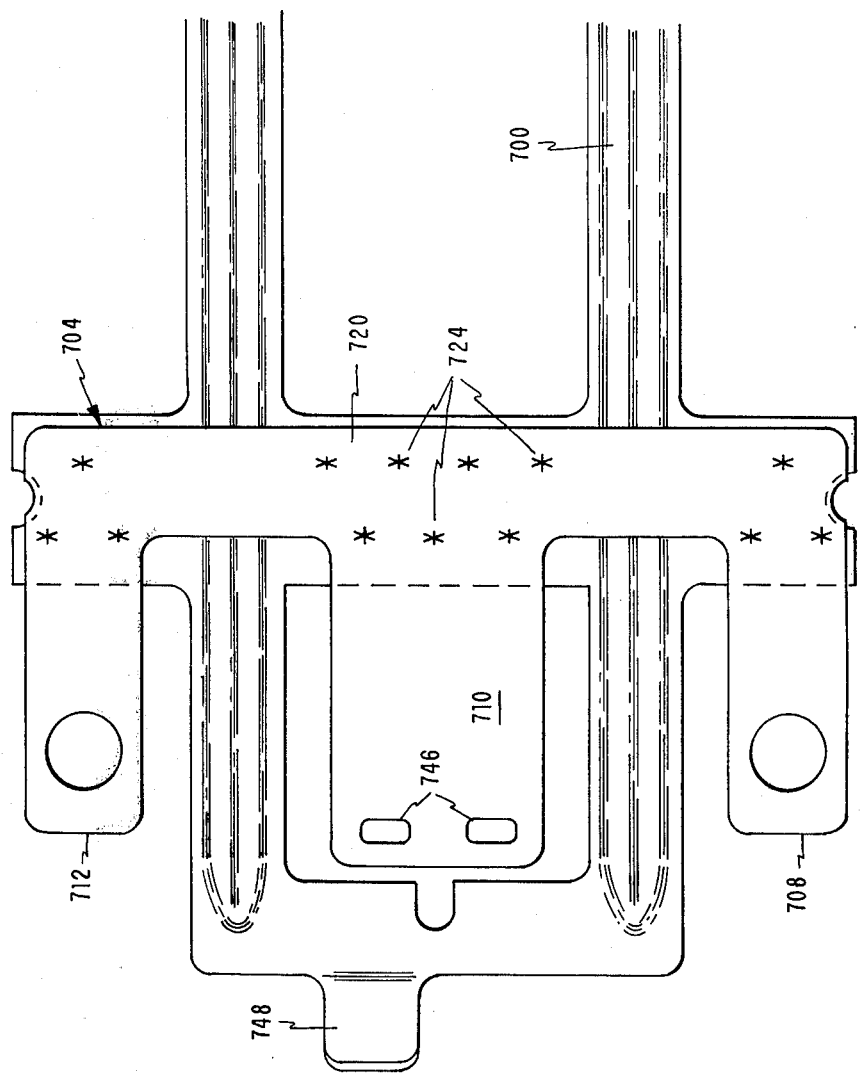
FIG. 8 is a fragmentary bottom view of an upper arm of the carriage assembly of FIGS. 6 and 7 and taken on line 8—8 of FIG. 7.
Figure 9:
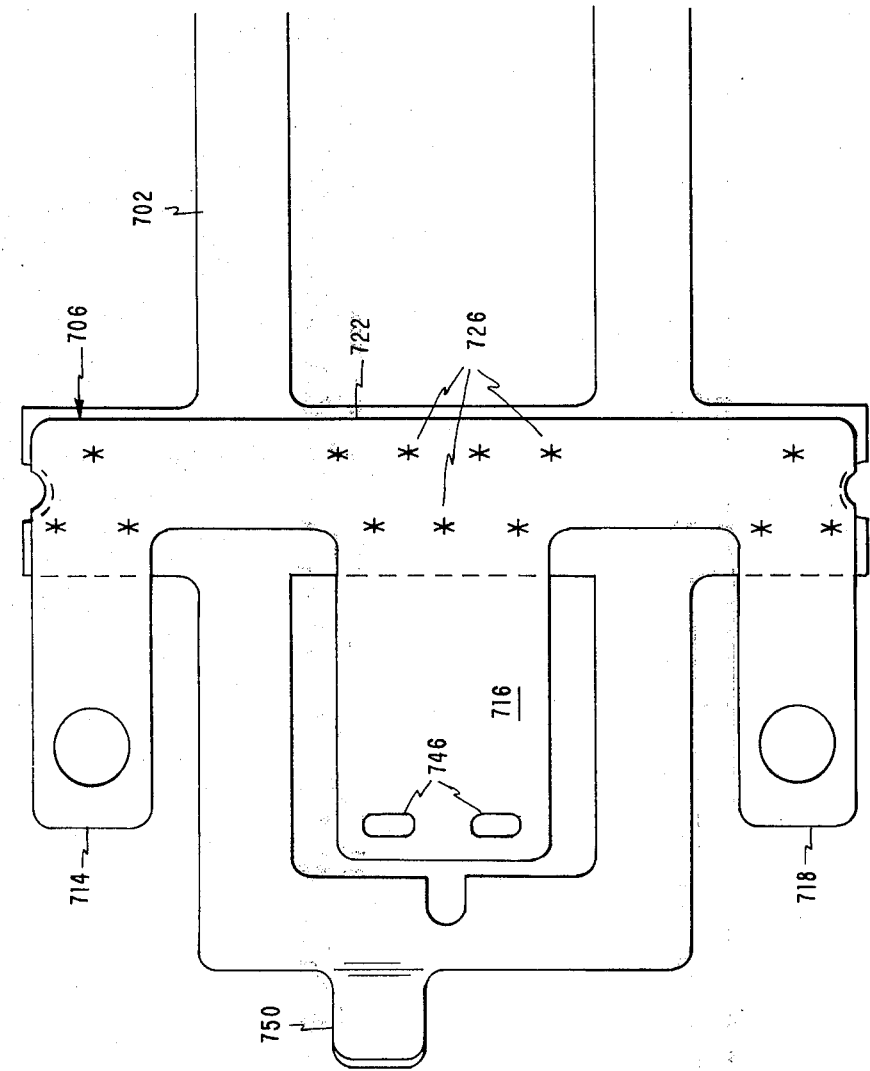
FIG. 9 is a top view of the lower arm of this assembly and taken on line 9—9 of FIG. 7.
Figure 10:
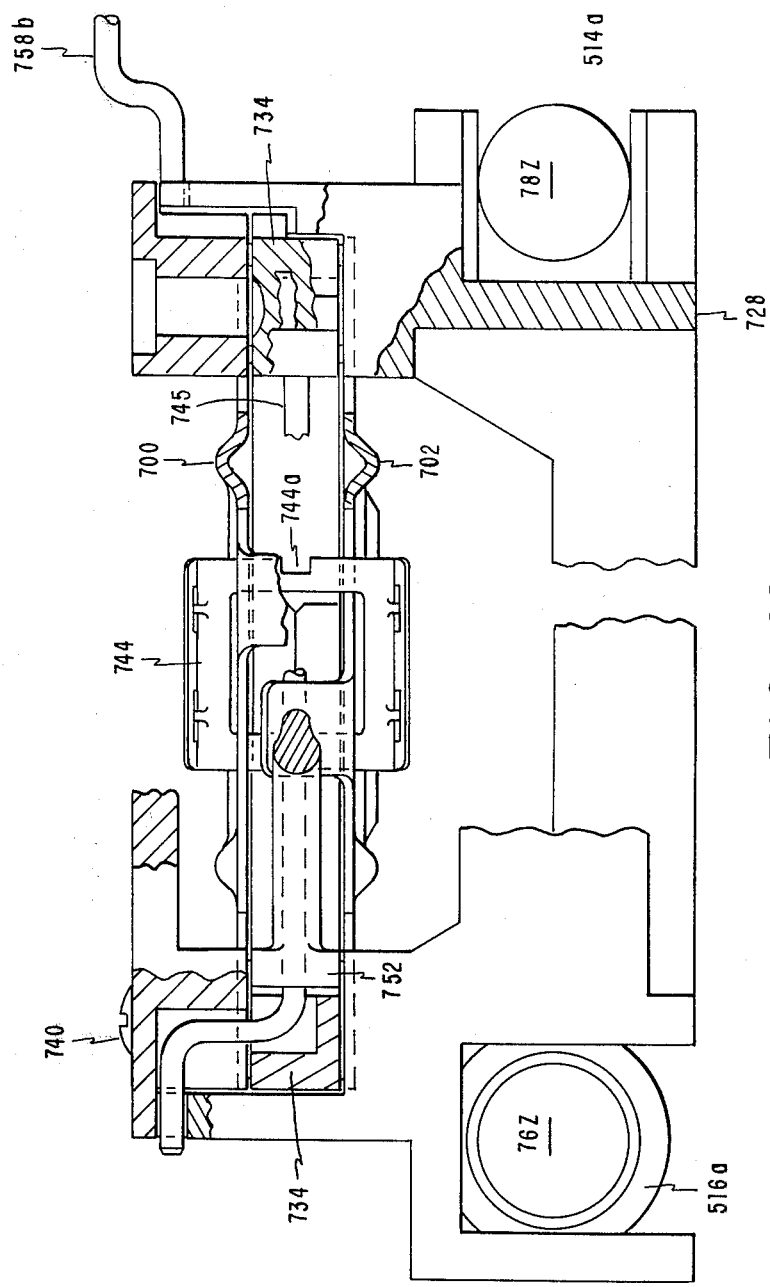
FIG. 10 is an end view of the assembly and taken on line 10—10 of FIG. 6.
Figure 11:
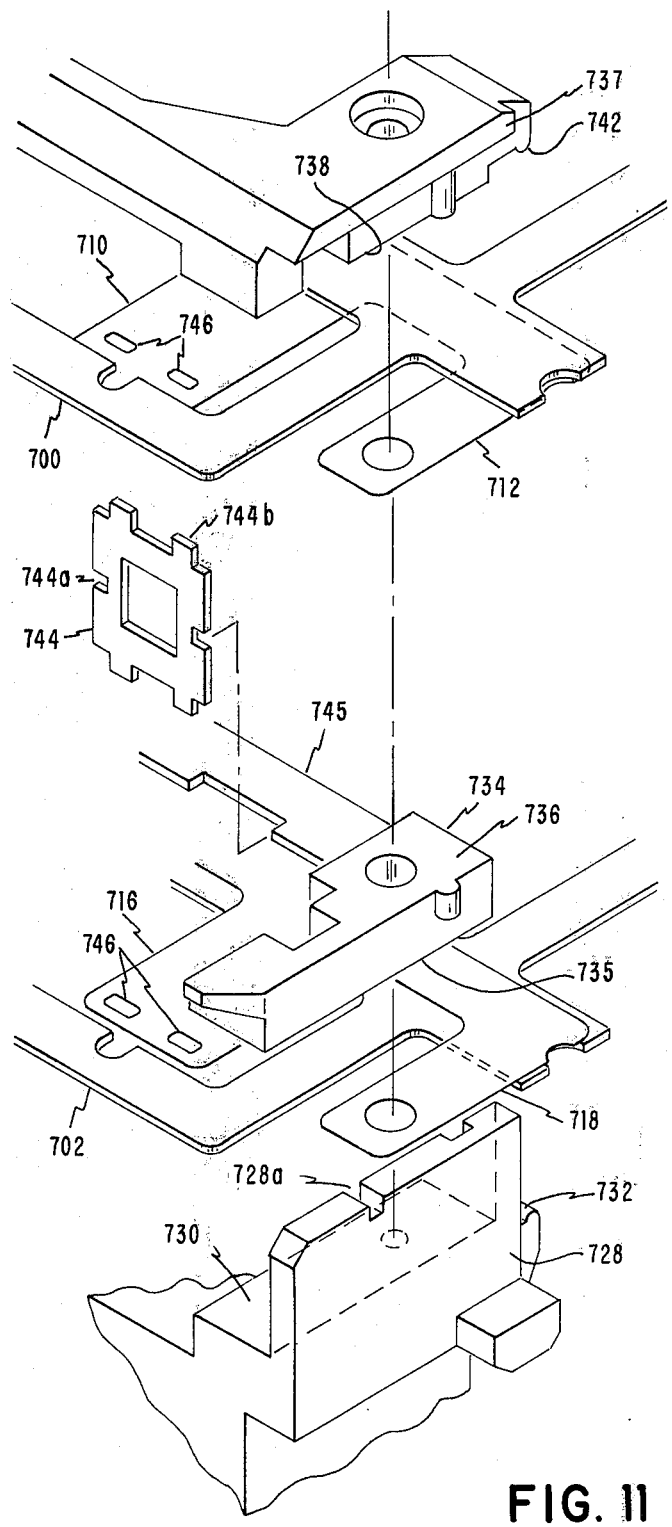
FIG. 11 is an exploded view of certain portions of the assembly.
Figure 12:
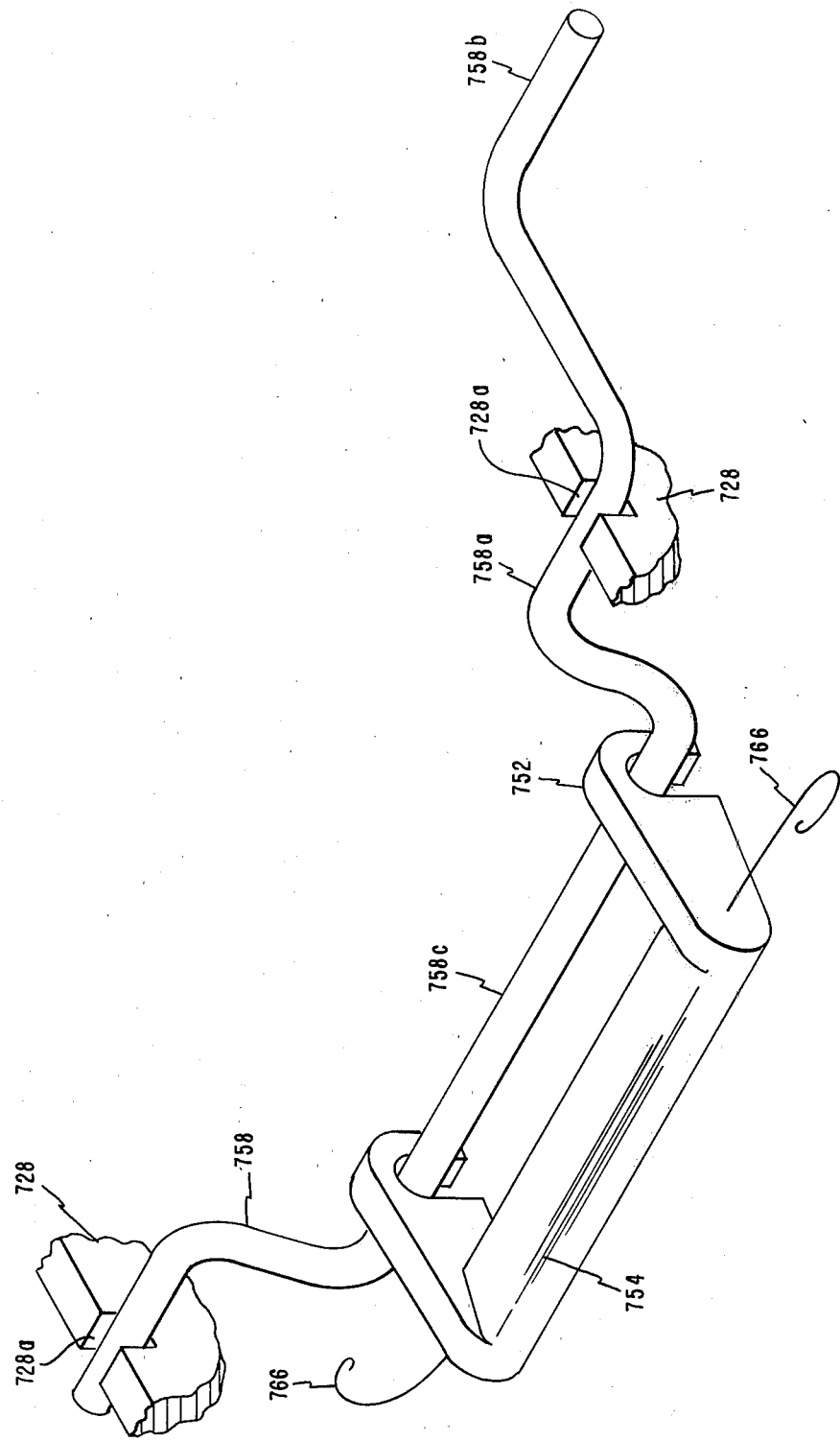
FIG. 12 is a schematic view of a controlling crank of this assembly shown in conjunction with certain surrounding parts.

The modified transducer carriage assembly 70R shown in FIGS. 6–12 may take the place on the guide rods 76Z and 78Z of the carriage assembly 70Z. The carriage assembly 70R includes the two swing arms 700 and 702 (see FIG. 7 in particular), and the distal transducer carrying end portions of these two arms 700 and 702 may respectively be the same as those for the arms 502 and 506 (to the right of the lines A—A in FIGS. 2–4 and FIGS. 6–8) and are thus not illustrated. The arms 700 and 702 are respectively upper and lower as they are shown in FIG. 7 and respectively correspond to arms 502 and 506 of the first embodiment. The assembly 70R has two E-shaped leaf springs 704 and 706 respectively corresponding to the springs 504 and 508 (see FIGS. 8 and 9 in particular), and the basic difference between the two embodiments is that the spring legs 708, 710 and 712 of the spring 704 and the legs 714, 716 and 718 of the spring 706 extend in a direction away from the transducers carried by the swing arms 700 and 702 rather than toward the transducers. The spring 704 includes a base portion 720 connecting the legs 708, 710 and 712; and the spring 706 includes a base portion 722 connecting the legs 714, 716 and 718. The base portion 720 is welded at 724 to the bottom surface of the arm 700, and the base portion 722 is welded at 726 to the upper surface of the arm 702 (as the arms are shown in FIG. 7).

The carriage assembly 70R includes a support 728 corresponding to the support 500 and carrying the grommet 516a (see FIGS. 6 and 10) and having a slot 514a for accommodating the guide rods 76Z and 78Z. The support 728 has a pair of opposite flat surfaces 730 (see FIG. 11) on which the spring legs 714 and 718 are disposed, and the support 728 has a pair of opposite fulcrum edges 732 on which the lower arm 702 rests for swingably disposing the arm 702 with respect to the support 728.

A spacer 734 is disposed above the surfaces 730 and has a pair of opposite lower flat surfaces 735 for confining the spring legs 714 and 718 between the spacer 734 and the support 728. The spacer 734 has a pair of opposite flat upper surfaces 736 on which the spring legs 708 and 712 are disposed, and a clamp member 737 is disposed above the spacer 734 and has a pair of opposite flat lower surfaces 738 for confining the spring legs 708 and 712 between the clamp member 737 and the spacer 734. Screws 740 extend through the clamp member 737 and spacer 734 and into the support 728 for the purpose of fixing these parts together and for clamping the spring legs 708, 712, 714 and 718 with respect to these parts. The clamp member 737 is provided with a pair of opposite fulcrum edges 742 in contact with an upper surface of arm 700 so as to swingably mount the arm 700 with respect to the clamp 737 and thereby with respect to the support 728.

A strut-like spreader 744 interlocks by means of notches 744a (see FIG. 11) with the central web portion 745 of spacer 734 and has tab-like ends 744b extending through openings 746 in the middle legs 710 and 716 of the springs 704 and 706. The spring legs 710 and 716 are thus stressed out of flat condition, and since the spring portions 720 and 722 are fixed with respect to the arms 700 and 702, the arms 700 and 702 are thus forced together.

The arms 700 and 702 are respectively provided with end portions or tabs 748 and 750 which cross each other in vertical elevation (see FIG. 7). In plan, the arm end portions 748 and 750 are out of line (see FIG. 6), and thus the arms 700 and 702 may be duplicates. A crank follower 752 is slideably disposed within a cavity in the spacer 734 and extends longitudinally of the arms 700 and 702, and the follower 752 is provided with a pair of surfaces 754 and 756 that converge toward each other so as to in effect form a wedge.

A crank 758 (see FIG. 12) extends through and is rotatably journaled in a pair of opposite slots 728a provided in the support 728. The crank 758 is provided with opposite coaxial journal portions 758a disposed in slots 728a, a crank arm portion 758b exterior of the support 728 by means of which the crank 758 may be turned and a central working crank portion 758c extending through slots 762 in the follower 752. Springs 766 extend between the crank follower 752 and the support 728 and clamp member 737 for the purpose of yieldably holding the wedge surfaces 754 and 756 out of contact with the arm end portions 748 and 750, with the follower 752 and crank arm portion 758b being in corresponding positions.

The embodiment of the invention shown in FIGS. 6-12 functions similarly to the first embodiment in maintaining the transducers 150Z and 152Z in light data transferring contact with the opposite faces of the disk 20Z. In the embodiment of FIGS. 6-12, however, the central legs 710 and 716 extend away from the transducers 150Z and 152Z, rather than toward these transducers; and the action of the spreader 744 in forcing the ends of the spring legs 710 and 716 apart causes the springs 704 and 706 to hold the transducers 150Z and 152Z in contact with the opposite faces of the disk 20Z. For DC or low frequency disk runout in this embodiment, the arms 700 and 702 swing slightly as a unit (with unvarying separation of the arms with respect to each other) about the fulcrum edges 732 and 742 with flexing of the spring legs 708, 712, 714 and 718 and initially without any impediment by the support 728 and parts attached to the support 728. For larger amplitudes of arm swing, however, this movement of the arms as a unit is limited by the spreader 744 and particularly by the web portion 745 of the spacer 734 disposed in the notches 744a that are somewhat wider than the web portion 745. Therefore, if, during DC runout, the swinging motion of the arms 700 and 702 becomes excessive, the spreader 744 will move into contact with the web portion 745 thus limiting the swinging of the arms. If the arms swing farther than this limited motion, one of the springs 704, for example, will become excessively stressed while the other spring 706, for example, becomes weaker in effect. This tends to return the arms to their neutral positions in which the spreader 744 has no forceful contact with the web portion 745 of the spacer 734.

There is still another advantageous facet of operation of the embodiment of FIGS. 6-12, and this pertains to the fulcrum edges 732 and 742. These fulcrum edges are effective on the surfaces of the arms 700 and 702 that are spaced by the thickness of these arms from the places at which the leaf springs 704 and 706 are welded to the arms. For example, the welds 724 are spaced from the lower peripheries of the fulcrum edges 742 by the thickness of the arm 700, and the same is true of the welds 726 with respect to the fulcrum edges 732. Therefore, during DC runout with swinging movements of the arms 700 and 702, there is a sliding action between the arms 700 and 702 and the fulcrum edges 732 and 742. This provides a damping effect to the swinging movement of the arms 700 and 702 and also overcomes to a large extent resonant effects of the arms during their swinging movements. This is due to the fact that each of the springs 704 and 706 tend to bend about their own neutral axes.

The crank arm portion 758b of the crank 758 (see FIG. 12) is rotated in order to swing the arms 700 and 702 apart for the insertion of the diskette 18Z, and this rotative movement of the crank 758 has the effect of moving the crank follower 752 in a direction through its cavity in the spacer 734 so that the wedge surfaces 754 and 756 contact and move the arm end portions 748 and 750 apart. The arms 700 and 702 then swing about the portions of the end legs 708, 712, 714 and 718 between their clamped portions and the fulcrum edges 732 and 742 as the arms 700 and 702 separate.

Both embodiments of the invention have the ability to accommodate for both so-called "DC" runouts and "AC" runouts of the flexible disk 20Z. A "DC" runout is a momentary shift or undulation in the disk 20Z from a nominal plane to a new and undesired plane and takes place at a low frequency, such as once or twice per disk revolution. An "AC" runout is a wobbling or fluttering of the disk 20Z that occurs much more frequently, such as 20 to 40 times per disk revolution. Both the "AC" runouts and "DC" runouts can occur using the same disk 20Z and disk assembly 18Z and are due to a number of reasons, such as the basic thinness of the disk and the fact that the disk is stamped out of a web of base material that has an inherent bend due to being stored in roll form. In unstressed conditions, when the transducers 150Z and 152Z are in contact with the disk 20Z, the spring legs 534, 536, 524, 526, 708, 712, 714 and 718 are flat and in single planes and thus these legs may be easily bent in order that the transducers 150Z and 152Z stay in data transferring contact with the disk 20Z particularly for "DC" or low frequency runouts in which there are slight swinging movements as a unit of the arms 502 and 506 or arms 700 and 702, with corresponding slight flexures of the springs 504, 508, 704 and 706. For the "AC" or high frequency runouts, the gimbal springs 584 and 614 and the backup springs 586 and 616 yield and maintain the transducers 150Z and 152Z in data transferring contact with the disk 20Z without substantial movements of the arms 502, 506, 700 and 702. Particularly since the leaf springs 504, 508, 704 and 706 are not substantially stressed out of their unstressed flat conditions, the transducers 150Z and 152Z stay in contact with the disk 20Z with substantially the same and opposite forces, assuring reliable data transfer.

It will be noted that the forces of all of the springs in each of the embodiments, the springs 504, 508, 584 and 586, for example, for the first embodiment, all balance and that there are not restraints or stops effective on the springs. In particular, there is no stop or setscrew which limits the approaching movement of the arms 502 and 506 and the arms 700 and 702 toward each other; and the transducer supporting springs 584, 586, 614 and 616 are the only limits to any action by the springs 504, 508, 704 and 706 tending to engage the transducers 150Z and 152Z with the disk 20Z. The result is that the transducers 150Z and 152Z remain in light data transferring contact with the disk 20Z even with "AC" and "DC" runouts of the disk.

It will be noted that the springs 504 and 508 supporting the arms 502 and 506 and the springs 704 and 706 supporting the arms 700 and 702 have dual functions—they not only allow free swinging movement of the arms 502 and 506 as a unit or the arms 700 and 702 as a unit, with no separating movement of the arms as the disk 20Z undulates; but they also function to hold the arms together (with respect to each other) and allow the movement of the arms apart so that the diskette 18Z can be put in operating position. With respect to the springs 504 and 508, this latter action is due to the fact that the central legs 528 and 538 are connected together by the tongues 571 and 573 on the distal ends of the springs, with the spring legs 528 and 538 between their distal ends and the base spring portions 522 and 532 being bent and stressed. This action occurs in the second embodiment due to the fact that the spreader 744 holds the spring legs 710 and 716 apart and thus in stressed condition.

It is of course desirable to maintain the arms 502, 504, 700 and 702 as light as possible for low inertia so that the arms may quickly and easily swing with "DC" disk runouts and maintain the transducers 150Z and 152Z in close compliance with the disk 20Z; and in this connection it is desirable also to put the pivot points of these arms as close to the transducers 150Z and 152Z as possible. The fulcrum edges 556 and 558 have thus been located quite close to the transducers 150Z and 152Z, and the arms 502 and 506 have been kept short and light. By turning the E-shaped springs (704 and 706) supporting the swing arms (700 and 702) around in the second embodiment as compared to the first embodiment, it is possible to locate the fulcrum edges 732 and 742 still closer to the transducers 150Z and 152Z, so even more satisfactory compliance of the transducers 150Z and 152Z on the disk 20Z can be expected with the second embodiment in comparison with the first embodiment.

The springs 504 and 508 at their places of attachment to the arms 502 and 506 and the springs 704 and 706 at their places of attachment to the arms 700 and 702 have substantially the same separation as do the dimples 594 of the gimbal springs 584 and 614. Thus, the pivot points of the swing arms 502, 506, 700 and 702 on the planes of the spring legs 524, 526, 534, 536, 708, 712, 714 and 718 are substantially in the same plane as the pivot points (at the dimples 594) of the transducers 150Z and 152Z. This results in a very close tracking of the transducers 150Z and 152Z on the opposite faces of the disk 20Z as the disk 20Z wobbles, with the transducers 150Z and 152Z staying substantially in alignment with each other. As has been previously noted, the read/write gaps 154aZ and 158aZ are out of line with respect to each other radially of disk 20Z (this may for example be for the distance of four magnetic tracks on the disk 20Z), with the disk contacting faces of the transducers 150Z and 152Z being aligned. It is desirable that this particular transducer gap spacing radially of disk 20Z be maintained even with wobbling of the disk, and the placement of the springs 504, 508, 704 and 706 at the same distance apart and in the same planes as the dimples 594 also provides for maintaining the same spacing of the gaps 154aZ and 158aZ radially of disk 20Z even though the disk wobbles with "DC" or "AC" runouts.

Advantageously, it is not necessary to make any adjustments in either of the embodiments to secure the desired loading of the heads 150Z and 152Z on the disk 20Z, since the springs 504, 508, 704 and 706 and the springs 584, 586, 614 and 616 cooperate together for this result. In the first embodiment, for example, the spring legs 528 and 538 move the arms 502 and 506 and the transducers 150Z and 152Z together with specified small bearing forces on the disk 20Z, and the spring force from spring legs 528 and 538 is balanced by the forces due to springs 584, 586, 614 and 616. These springs may be relatively easily manufactured to close tolerances for providing this result. Due to the lack of adjustments in both embodiments, they are relatively low cost while yet providing a quite rigid control of the loading of the heads 150Z and 152Z on the disk 20Z. The two embodiments are quite tolerant of "AC" and "DC" runouts of the disk 20Z, and the tines 636 and 638 are sufficient to position the disk 20Z accurately enough so that it is not necessary to clamp the disk assembly 18Z when data transfer is taking place. The tines 636 and 638 restrain the jacket 22Z of the disk assembly 18Z sufficiently so that the jacket 22Z cannot billow out and interfere with the arms 502, 506, 700 and 702 which would disturb the positions of the transducers 150Z and 152Z on the surface of the disk 20Z. The tines 636 and 638 in addition allow an air flow around the disk 20Z in its jacket 22Z which is not pinched off by clamping the assembly. There thus may be a desirable air flow on the surface of the disk 20Z and under the transducers 150Z and 152Z maintaining these transducers in reliable data transferring pressure and position with respect to disk 20Z. The tines 636 and 638 in loosely holding the assembly 18Z in place allow the disk 20Z to wander more along the axis of drive of the disk; however, this is acceptable with both of the embodiments of the invention due to the balance of spring forces above mentioned.

Due to the use of the tines 636 and 638, it is not necessary to have and utilize an electric solenoid actuated clamping mechanism for the diskette 18Z for holding the disk 20Z in a definite predetermined plane as is utilized in the construction of U.S. Pat. No. 4,089,029; and this results in a reduction in cost. Just as an example, it may be stated that successful operation in this respect was obtained with diskettes 18Z that varied in thickness at their lower edges embraced by the tines 636 and 638 from 1.27 mm to 1.72 mm, although the sum of the thicknesses of the jacket 22Z and disk 20Z of the diskette 18Z would be less, up to 0.8 mm, since the disk 20Z during operation may wander within the jacket 22Z of the diskette 18Z, and the disk 20Z has air surrounding it. The distance between a tine 636 and the tine 638 on the same side of the diskette may be about 1.8 mm, for example.

Since there is no such arm limiting set screw in the designs hereof, the loading of the transducers 150Z and 152Z on the disk 20Z may advantageously be very light for a minimum of abrasion. This is due to the fact that the arms 502, 506, 700 and 702 are not really fixed with respect to each other, and a loading of one of the transducers 150Z or 152Z does not necessarily result in an unloading of the other transducer on disk wobble. Thus a heavier transducer loading for assuring that both transducers remain loaded on the disk for all disk wobbling conditions, with the arms being in effect fixed together, is not required.

Having thus described the invention, what is claimed as new, and desired to be secured by Letters Patent is:

1. A transducer-carriage assembly for use with a rotatable thin flexible disk having high frequency undulations and low frequency undulations as the disk rotates and comprising:
    a pair of transducers,
    a pair of arms adapted to embrace the disk,
    a support,
    a pair of leaf springs mounted on said support and respectively connected to said arms adjacent one end thereof and which lie in single planes in the unstressed condition so that the other, distal ends of said arms may swing without impediment by said support, and
    a pair of gimbal springs having said pair of transducers respectively secured thereto and respectively attached to said pair of arms adjacent the distal ends thereof to position said pair of transducers at opposite sides of said disk,
    said gimbal springs, when unstressed, being substantially coplanar to said leaf spring connected to the respective arm, and
    a resilient load member carried by each of said arms adjacent to and engaging said gimbal spring to permit universal motion of the associated transducer about the point of contact between said gimbal spring and said load member, whereby said arm and transducer assemblies may swing simultaneously and as a unit both in the same direction or both in the opposite direction in a plane parallel with the axis of the disk with flexing of said leaf springs for low frequency undulations of the disk and said gimbal springs may flex without substantial swinging movements of said arms with high frequency undulations of the disk with said transducers being in data transferring contact with the disk for both the low frequency undulations and also the high frequency undulations.

2. A transducer-carriage assembly as set forth in claim 1, each of said leaf springs being in the same plane as the said universal joint connection for this arm and said universal joint connections and said leaf springs being the same distances apart when said transducers are in contact with said disk.

3. A transducer-carriage assembly as set forth in claim 1, each of said leaf springs being flat and unstressed when said transducers are in contact with said disk.

4. A transducer-carriage assembly as set forth in claim 1 and including a fulcrum edge carried by said support for each of said arms and effective for allowing the swinging movement of the arm with respect to said support.

5. A transducer-carriage assembly as set forth in claim 4, said fulcrum edges being respectively in contact with said leaf springs.

6. A transducer-carriage assemby as set forth in claim 4, each of said leaf springs being fixed to one face of the respective one of said arms and said fulcrum edges being effective on the opposite faces of the respective arms.

7. A transducer suspension for use with a magnetic disk comprising:
    a pair of arms adapted to receive the magnetic disk between them,
    a support,
    a pair of leaf springs respectively fixed to said arms adjacent a first end of each of the arms,
    a pair of transducers each carried by one of said arms adjacent the other, second end of the arm and adapted to be held by the arms in close data transferring relationship with respect to opposite surfaces of the magnetic disk positioned between the arms,
    said leaf springs each having outer spring leg portions and a central spring leg portion, and
    means for connecting said outer leg portions to said support so that said arms may swingingly move with respect to said support with changes in the plane of said disk,
    said central leg portions of said leaf springs being connected together so as to urge said arms together.

8. A transducer suspension as set forth in claim 7, each of said leaf springs being E-shaped to provide a pair of said outer spring leg portions on opposite sides of a said central spring leg portion,
    said outer leg portions and said central leg portion of each of said leaf springs extending from said first end of the respective arm toward the said second end of said arm on which the respective transducer is carried and said central leg portions extending toward one another and being connected at their ends and thus providing a force on said arms to move the said second ends of the arms and said transducers together.

9. A transducer suspension as set forth in claim 7, each of said leaf springs being E-shaped to provide a pair of said outer spring leg portions on opposite sides of a said central spring leg portion,
    said central leg portion and said outer leg portions of each of said leaf springs extending toward said first end of the respective arm, the transducer suspension, including a spreader disposed between the ends of said central spring leg portions for holding the ends of these portions apart and thus providing a force on said arms to move the said second ends of the arms and said transducers together.

10. In a disk drive machine for use with a disk-jacket assembly in which a flexible disk is rotatably disposed within a jacket which has radially extending transducers receiving slots, the combination of:

fixed abutment means on the opposite sides of said jacket slots and disposed apart at a greater spacing than the thickness of the jacket for holding the jacket loosely in an operative position, and a transducer-carriage assembly including:
  a pair of transducers,
  a pair of arms adapted to embrace the disk,
  a carriage,
  a pair of leaf springs respectively connected to and mounting each of said arms adjacent one end thereof to said carriage so that the other, distal ends of said arms may swing without impediment by said carriage,
  a pair of gimbal spring means having said pair of transducers respectively secured thereto for mounting each of said transducers respectively on one of said arms adjacent the said distal ends thereof in coplanar relation, when unstressed, with the associated leaf spring so that the transducers may extend through said jacket slots into data transferring contact with opposite surfaces of said disk, and
  a resilient load member carried by each of said arms adjacent to and engaging said gimbal spring to permit universal motion of the associated transducer about the point of contact between said gimbal spring and load member, whereby said arms and said transducers may swing as a unit with flexing of said leaf springs for low frequency undulations of the disk and said gimbal springs may flex with high frequency undulations of the disk with said transducers remaining in data transferring contact with the disk for both the low frequency undulations and also the high frequency undulations.

* * * * *